US011218996B2

(12) United States Patent
Wang et al.

(10) Patent No.: US 11,218,996 B2
(45) Date of Patent: Jan. 4, 2022

(54) PUCCH RESOURCE ALLOCATION BEFORE RRC SETUP

(71) Applicant: QUALCOMM Incorporated, San Diego, CA (US)

(72) Inventors: Renqiu Wang, San Diego, CA (US); Yi Huang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/370,483

(22) Filed: Mar. 29, 2019

(65) Prior Publication Data
US 2019/0313401 A1  Oct. 10, 2019

Related U.S. Application Data

(60) Provisional application No. 62/654,302, filed on Apr. 6, 2018.

(51) Int. Cl.
*H04W 72/04* (2009.01)
*H04B 1/713* (2011.01)

(52) U.S. Cl.
CPC ........ *H04W 72/0413* (2013.01); *H04B 1/713* (2013.01); *H04W 72/042* (2013.01)

(58) Field of Classification Search
CPC . H04W 72/0413; H04W 72/042; H04B 1/713
See application file for complete search history.

(56) References Cited

U.S. PATENT DOCUMENTS

2018/0324773 A1\* 11/2018 Fu .......................... H04L 5/0082
2019/0223199 A1\* 7/2019 Park ................... H04W 72/1289
(Continued)

FOREIGN PATENT DOCUMENTS

WO   WO-2018031066 A1   2/2018

OTHER PUBLICATIONS

Remaining issues on resource allocation for PUCCH 3GPP TSG RAN WG1 Meeting #92 R1-1801342 Athens, Greece Feb. 26-Mar. 2, 2018 Huawei (Year: 2018).\*

(Continued)

*Primary Examiner* — Kevin M Cunningham
(74) *Attorney, Agent, or Firm* — Qualcomm Incorporated

(57) ABSTRACT

Certain aspects of the present disclosure provide techniques for physical uplink control channel (PUCCH) before radio resource control connection setup completion. A by a base station (BS) generally includes transmitting a system information block, to a user equipment (UE), containing system information indicating a resource set of a plurality of predefined resource sets, each containing a plurality of resources. The BS transmits downlink control information on physical downlink control channel associated with a control channel element (CCE) index, to the UE, containing resource indicator (RI) bits to indicate a resource of the plurality of resources of the indicated resource set available for the UE to use for transmitting uplink control information (UCI) in a PUCCH. The BS monitors the indicated resource for the PUCCH transmission. A UE determines the resource based on the SI, RI bits, and CCE index, and transmits UCI in the PUCCH on the determined resource.

34 Claims, 14 Drawing Sheets

(56) References Cited

U.S. PATENT DOCUMENTS

2019/0261356 A1* 8/2019 Myung ............. H04W 72/0413
2019/0297618 A1* 9/2019 Yang ......................... H04L 5/00

OTHER PUBLICATIONS

Remaining issues on resource allocation for PUCCH 3GPP TSG RAN WG1 Meeting #92 R1-1802102 Athens, Greece Feb. 26-Mar. 2, 2018 OPPO (Year: 2018).*

PUCCH resource allocation prior to RRC configuration 3GPP TSG RAN WG1 Meeting #92 R1-1801695 Athens, Greece Feb. 26-Mar. 2, 2018 NEC (Year: 2018).*

CATT: "PUCCH Resource Allocation", 3GPP Draft; R1-1801734, 3rd Generation Partnership Project (3GPP), Mobile Competence Centre, 650, Route Des Lucioles ; F-06921 Sophia-Antipolis Cedex, France, vol. RAN WG1, No. Athens, Greece; Feb. 26, 2018-Mar. 2, 2018, Feb. 17, 2018 (Feb. 17, 2018), 7 Pages, XP051397715, Retrieved from the Internet: URL: http://www.3gpp.org/ftp/tsg_ran/WG1_RL1/TSGR1_92/Docs/ [retrieved on Feb. 17, 2018].

Huawei., et al., "Remaining Issues on Resource Allocation for PUCCH" 3GPP Draft; R1-1801342, 3rd Generation Partnership Project (3GPP), Mobile Competence Centre, 650, Route Des Lucioles; F-06921 Sophia-Antipolis Cedex, France, vol. RAN WG1, No. Athens, Greece; Feb, 26, 2018-Mar. 2, 2018, Feb. 17, 2018 (Feb. 17, 2018), 4 Pages, XP051397506, Retrieved from the Internet: URL: http://www.3gpp.org/ftp/tsg_ran/WG1_RL1/TSGR1_92/Docs/ [retrieved on Feb. 17, 2018].

International Search Report and Written Opinion—PCT/US2019/025214—ISA/EPO—dated May 24, 2019.

Nokia., et al., "Remaining Open Items on PUCCH Resource Allocation", 3GPP Draft; R1-1802026_PUCCH Resource Allocation, 3rd Generation Partnership Project (3GPP), Mobile Competence Centre, 650, Route Des Lucioles ; F-06921 Sophia-Antipolis Cedex, France, vol. RAN WG1, No. Greece, Athens; Feb. 26, 2018-Mar. 2, 2018, Feb. 16, 2018 (Feb. 16, 2018), 14 Pages, XP051397452, Retrieved from the Internet: URL: http://www.3gpp.org/ftp/tsg_ran/WG1_RL1/TSGR1_92/Docs/ [retrieved on Feb. 16, 2018].

* cited by examiner

| RMSI values | Duration | Repetition factor | RB index of the 1st hop for short duration | Initial Shift index per RB | OCC index per RB |
|---|---|---|---|---|---|
| 0 | 2 | 1 | 0, N-1 | 0, 1, 3, 4, 6, 7, 9, 10 | NA |
| 1 | 2 | 1 | 0, 1, N-1, N-2 | 0, 3, 6, 9 | NA |
| 2 | 4 | 1 | 0, N-1 | 0, 1, 3, 4, 6, 7, 9, 10 | NA |
| 3 | 4 | 1 | 0, 1, N-1, N-2 | 0, 3, 6, 9 | NA |
| 4 | 10 | 1 | 0, N-1 | 0, 3, 6, 9 | 0, 1 |
| 5 | 10 | 1 | 0, 1, N-1, N-2 | 0, 3, 6, 9 | 0 |
| 6 | 14 | 1 | 0, N-1 | 0, 3, 6, 9 | 0, 1 |
| 7 | 14 | 1 | 0, 1, N-1, N-2 | 0, 3, 6, 9 | 0 |
| 8 | 14 | 1 | 0, 1, N-1, N-2 | 0, 6 | 0, 1 |
| 9 | 14 | 1 | 0, 1, 2, 3, N-1, N-2, N-3, N-4 | 0, 6 | 0 |
| 10 | 14 | 2 | 0, N-1 | 0, 3, 6, 9 | 0, 1 |
| 11 | 14 | 2 | 0, 1, N-1, N-2 | 0, 3, 6, 9 | 0 |
| 12 | 14 | 2 | 0, 1, N-1, N-2 | 0, 6 | 0, 1 |
| 13 | 14 | 2 | 0, 1, 2, 3, N-1, N-2, N-3, N-4 | 0, 6 | 0 |
| 14 | Reserved | | | | |
| 15 | Reserved | | | | |

| | ARI value | Relative resource index in the subset | RB index | OCC index | Shift index |
|---|---|---|---|---|---|
| 0 | 0 | 0 | 0 | 0 | 0 |
| 1 | 0 | 1 | 0 | 0 | 3 |
| 2 | 1 | 0 | 0 | 0 | 6 |
| 3 | 1 | 1 | 0 | 0 | 9 |
| 4 | 2 | 0 | 0 | 1 | 0 |
| 5 | 2 | 1 | 0 | 1 | 3 |
| 6 | 3 | 0 | 0 | 1 | 6 |
| 7 | 3 | 1 | 0 | 1 | 9 |
| 8 | 4 | 0 | N-1 | 0 | 0 |
| 9 | 4 | 1 | N-1 | 0 | 3 |
| 10 | 5 | 0 | N-1 | 0 | 6 |
| 11 | 5 | 1 | N-1 | 0 | 9 |
| 12 | 6 | 0 | N-1 | 1 | 0 |
| 13 | 6 | 1 | N-1 | 1 | 3 |
| 14 | 7 | 0 | N-1 | 1 | 6 |
| 15 | 7 | 1 | N-1 | 1 | 9 |

FIG. 10

PUCCH RESOURCE ALLOCATION BEFORE RRC SETUP

CROSS-REFERENCE TO RELATED APPLICATION & PRIORITY CLAIM

This application claims benefit of and priority to U.S. Provisional Patent Application Ser. No. 62/654,302, filed Apr. 6, 2018, herein incorporated by reference in its entirety as if fully set forth below and for all applicable purposes.

BACKGROUND

Field of the Disclosure

Aspects of the present disclosure relate to wireless communications, and more particularly, to techniques for physical uplink control channel (PUCCH) resource allocation before radio resource control (RRC) setup.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure relate to techniques for physical uplink control channel (PUCCH) resource allocation before radio resource control (RRC) setup.

Certain aspects provide a method for wireless communication by a base station (BS). The method generally includes transmitting a system information block (SIB), to a user equipment (UE), containing system information (SI) indicating a resource set of a plurality of predefined resource sets, each resource set containing a plurality of resources. The BS transmits downlink control information (DCI) on a physical downlink control (DCI) associated with a control channel element (CCE) index, to the UE, containing resource indicator (RI) bits to indicate a resource of the plurality of resources of the indicated resource set available for the UE to use for transmitting uplink control information (UCI) in a PUCCH transmission. The BS monitors the indicated resource for the PUCCH transmission.

Certain aspects provide a method for wireless communication by a UE. The method generally includes receiving a SIB, from a BS, containing SI indicating a resource set of a plurality of predefined resource sets, each resource set containing a plurality of resources. The UE receives DCI on a PDCCH, from the BS, containing RI bits indicating a resource of the plurality of resources of the indicated resource set available for the UE to use for transmitting UCI in a PUCCH transmission. The UE determines the resource based on the SI, the RI bits, and a CCE index of the PDCCH. The UE transmits the UCI in the PUCCH using the determined resource.

Certain aspects provide an apparatus for wireless communication. The apparatus generally includes means for transmitting a SIB, to another apparatus, containing SI indicating a resource set of a plurality of predefined resource sets, each resource set containing a plurality of resources. The apparatus includes means for transmitting DCI in a PDCCH associated with a CCE index, to the another apparatus, containing RI bits to indicate a resource of the plurality of resources of the indicated resource set available for the another apparatus to use for transmitting UCI in a PUCCH transmission. The apparatus includes means for monitoring the indicated resource for the PUCCH transmission.

Certain aspects provide an apparatus for wireless communication. The apparatus generally includes means for receiving a SIB, from another apparatus, containing SI indicating a resource set of a plurality of predefined resource sets, each resource set containing a plurality of resources. The apparatus includes means for receiving DCI in a PDCCH, from the another apparatus, containing RI bits indicating a resource of the plurality of resources of the indicated resource set available for the apparatus to use for transmitting UCI in a PUCCH transmission. The apparatus includes means for determining the resource based on the SI, the RI bits, and a CCE index of the PDCCH. The apparatus includes means for transmitting the UCI in the PUCCH using the determined resource.

Certain aspects provide an apparatus for wireless communication. The apparatus generally includes a transmitter configured to transmit a SIB, to another apparatus, containing SI indicating a resource set of a plurality of predefined resource sets, each resource set containing a plurality of resources. The transmitter is further configured to transmit DCI in a PDCCH associated with a CCE index, to the another apparatus, containing RI bits to indicate a resource of the plurality of resources of the indicated resource set available for the another apparatus to use for transmitting UCI in a PUCCH transmission. The apparatus includes at least one processor coupled with a memory and configured to monitor the indicated resource for the PUCCH transmission.

Certain aspects provide an apparatus for wireless communication. The apparatus generally includes a receiver configured to receive a SIB, from another apparatus, containing SI indicating a resource set of a plurality of predefined resource sets, each resource set containing a plurality of resources. The receiver is further configured to receive DCI in a PDCCH, from the another apparatus, containing RI bits indicating a resource of the plurality of resources of the indicated resource set available for the apparatus to use for transmitting UCI in a PUCCH transmission. The apparatus includes at least one processor coupled with a memory and configured to determine the resource based on the SI, the RI bits, and a CCE index of the PDCCH. The apparatus includes a transmitter configured to transmit the UCI in the PUCCH using the determined resource.

Certain aspects provide a computer readable medium having computer executable code stored thereon for wireless communication. The computer readable medium generally includes code for transmitting a SIB, to a UE, containing SI indicating a resource set of a plurality of predefined resource sets, each resource set containing a plurality of resources. The computer readable medium includes code for transmitting DCI in a PDCCH associated with a CCE index, to the UE, containing RI bits to indicate a resource of the plurality of resources of the indicated resource set available for the UE to use for transmitting UCI in a PUCCH transmission. The computer readable medium includes code for monitoring the indicated resource for the PUCCH transmission.

Certain aspects provide a computer readable medium having computer executable code stored thereon for wireless communication. The computer readable medium generally includes code for receiving a SIB, from a BS, containing SI indicating a resource set of a plurality of predefined resource sets, each resource set containing a plurality of resources. The computer readable medium includes code for receiving DCI in a PDCCH, from the B S, containing RI bits indicating a resource of the plurality of resources of the indicated resource set available for a UE to use for transmitting UCI in a PUCCH transmission. The computer readable medium includes code for determining the resource based on the SI, the RI bits, and a CCE index of the PDCCH. The computer readable medium includes code for transmitting the UCI in the PUCCH using the determined resource.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9 is a table illustrating an example mapping of remaining system information (RMSI) bit values to allocated resource sets for PUCCH, in accordance with certain aspects of the present disclosure.

FIG. 10 is a table illustrating an example mapping of allocation resource indicator (ARI) bit values to allocated resources within an allocated resource set for PUCCH, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
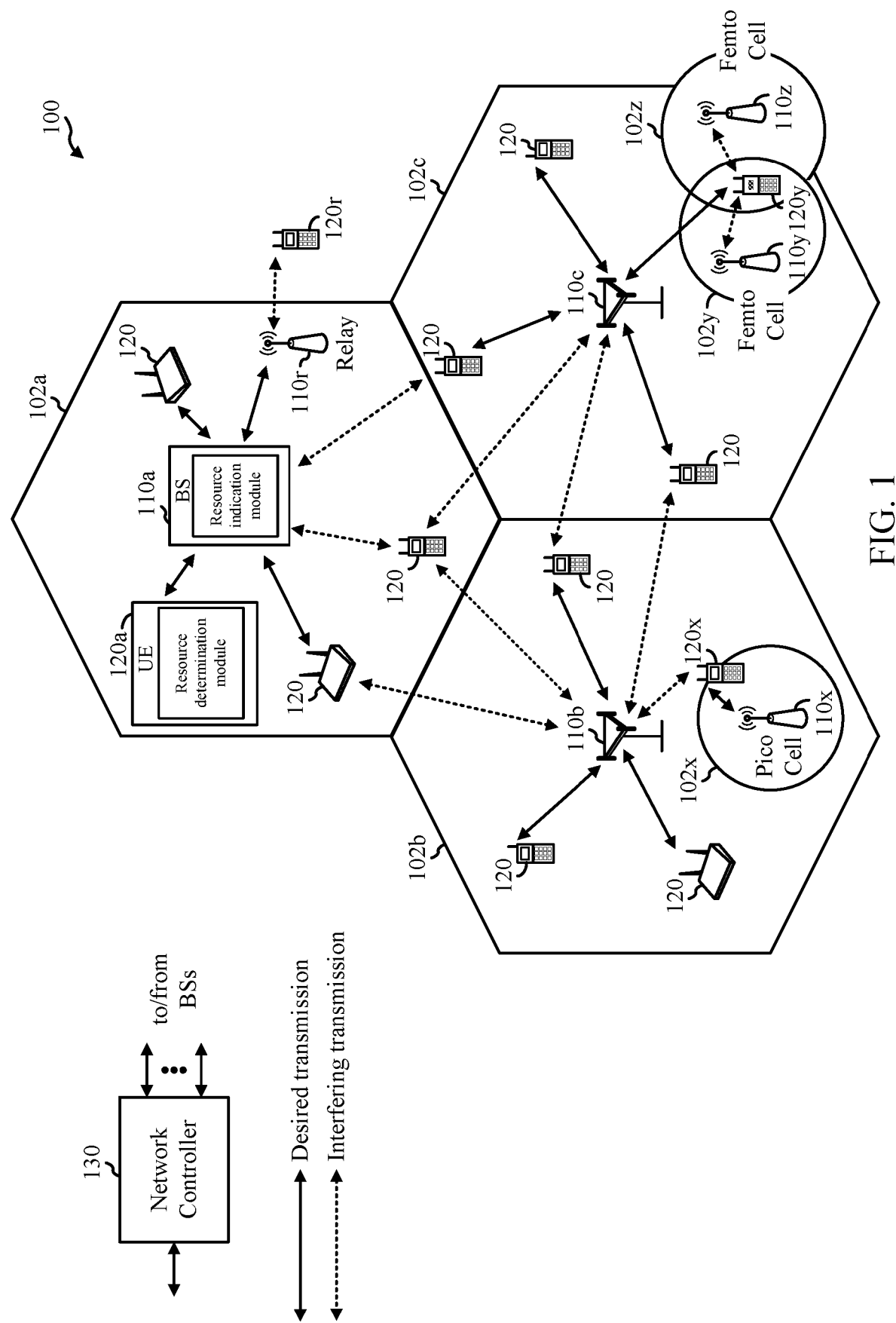
FIG. 1 is a block diagram conceptually illustrating an example telecommunications system, in accordance with certain aspects of the present disclosure.

Aspects of the present disclosure provide apparatus, methods, processing systems, and computer readable mediums for physical uplink control channel (PUCCH) resource allocation before radio resource control (RRC) setup.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, a BS 110 can transmit a system information block (SIB) to a UE 120 containing system information (SI) indicating a resource set of a plurality of configured resource sets. In some examples, each resource set has sixteen resources. The BS 110 transmits downlink control information (DCI), in a physical downlink control channel (PDCCH) associated with a control channel element (CCE) index, to the UE 120 containing resource indicator (RI) bits to indicate a resource of the plurality of resources of the indicated resource set, available for the UE 120 to use for transmitting uplink control information (UCI) in a physical uplink control channel (PUCCH) transmission. For example, as shown in FIG. 1, the BS 110a includes a resource indication modulate configured to indicate the resource via the SI, the RI bits, and the CCE index. The BS 110 monitors the indicated resource for the PUCCH transmission. The UE 120 determines the resource based on the SI, the RI bits, and the CCE index, and transmits UCI in the PUCCH on the determined resource. For example, as shown in FIG. 1, the UE 120a includes a resource determination module configured to determine the resource based on the SI, the RI, and the CCE index.

As illustrated in FIG. 1, the wireless communication network 100 may include a number of base stations (BSs) 110 and other network entities. ABS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
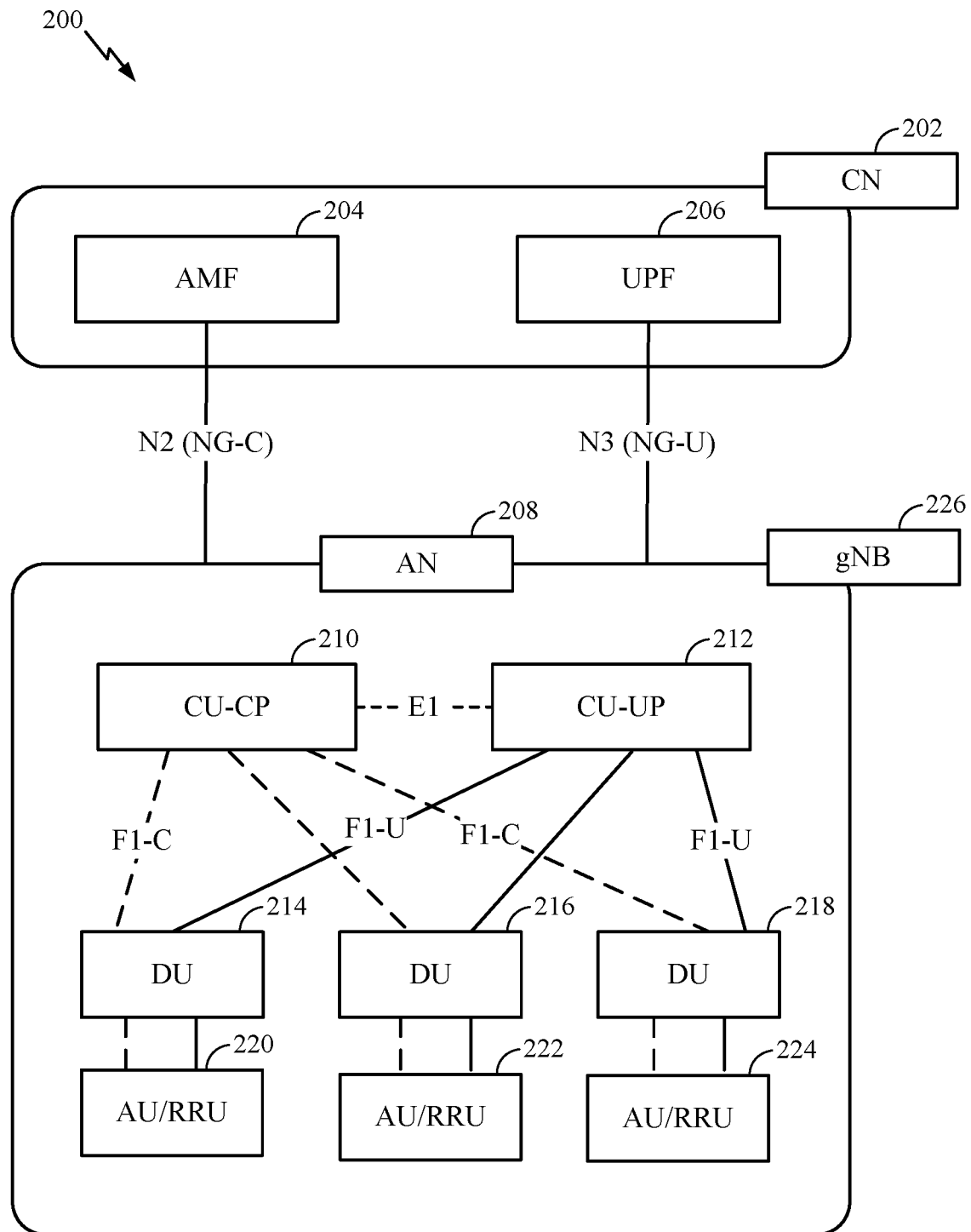
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in 2, the CU-CP 210 may be connected to multiple DUs, but the DUs may be connected to only one CU-CP. Although 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
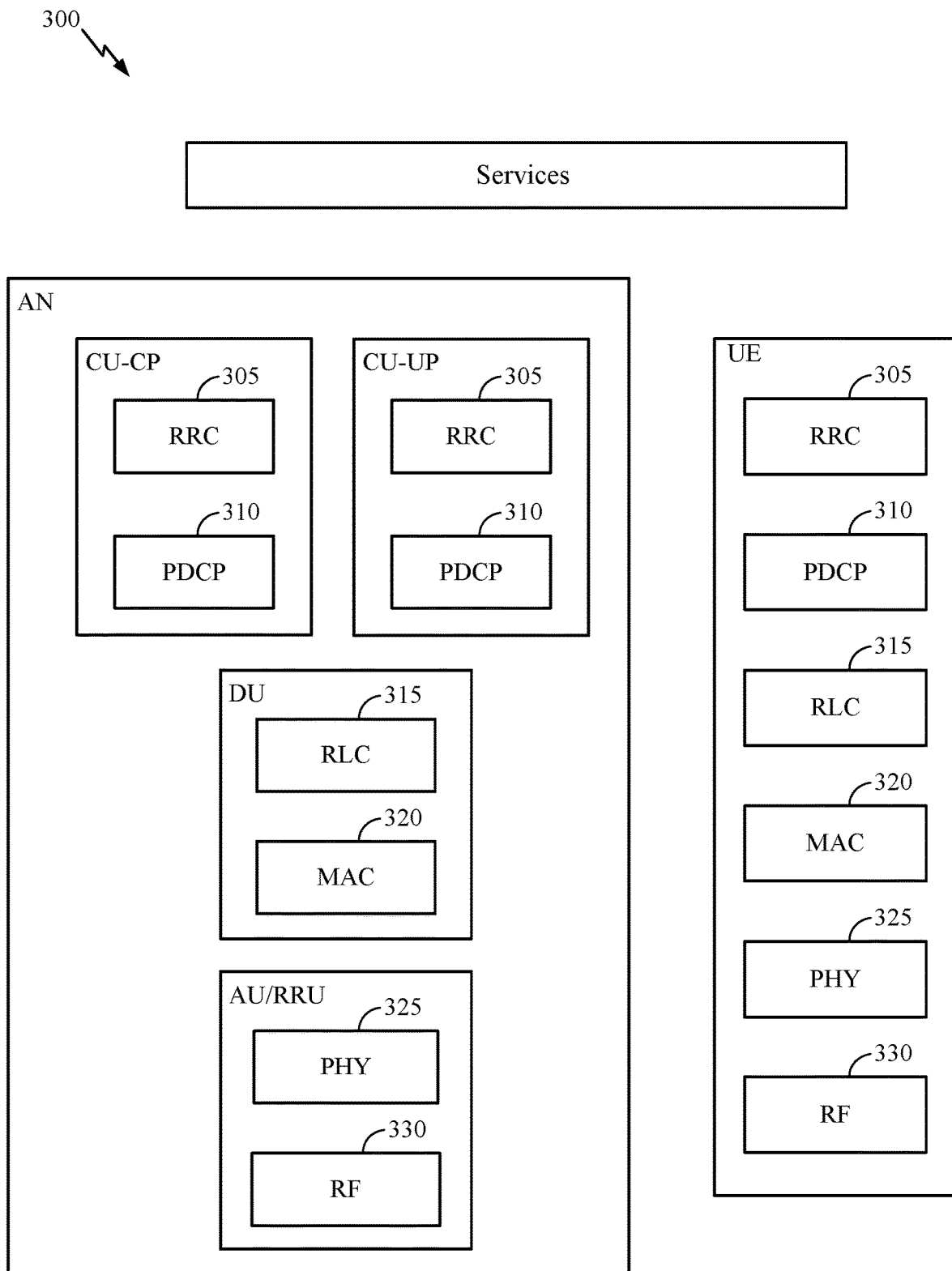
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
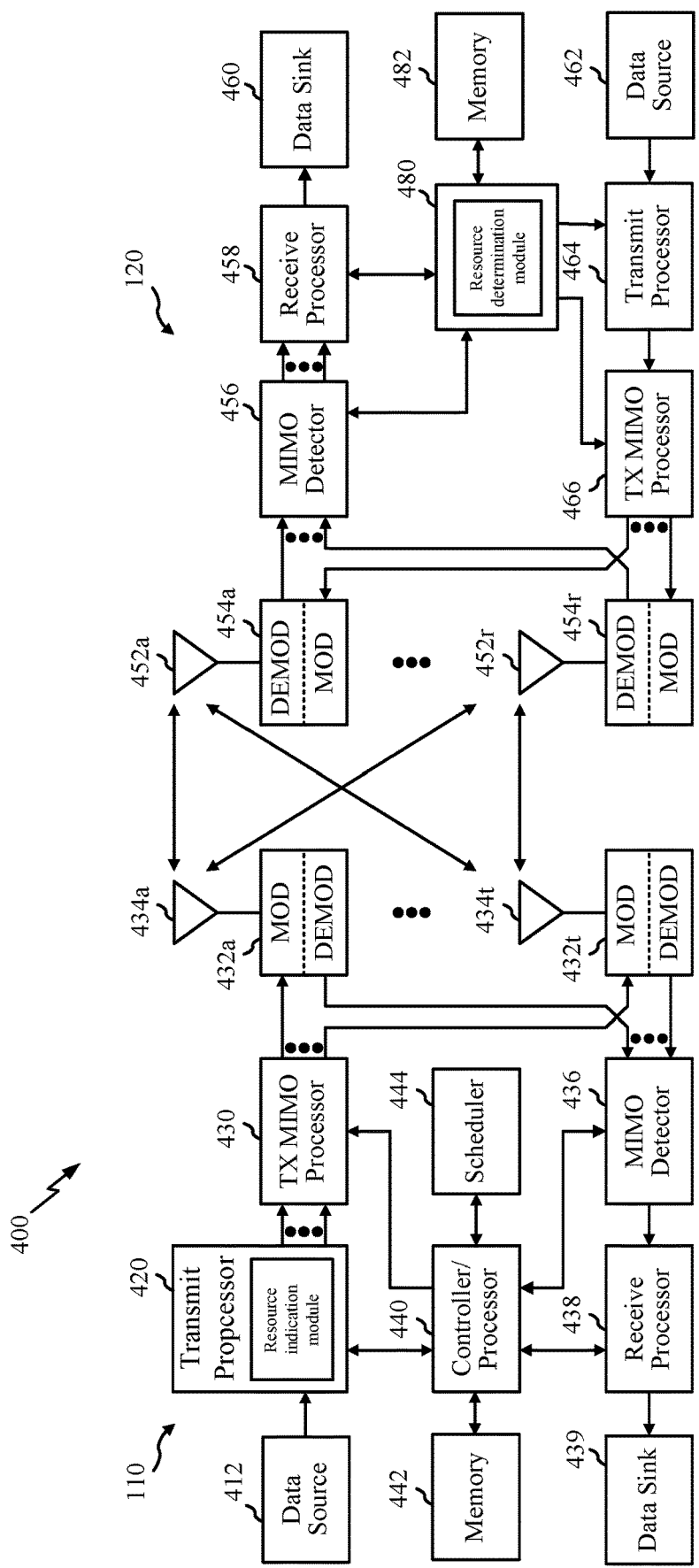
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for PUCCH resource allocation before RRC setup. For example, as shown in FIG. 4, the transmit processor 420 of the BS 110 includes a resource indication modulate configured to indicate the resource via the SI, the RI bits, and the CCE index. Further, as shown in FIG. 4, the controller/processor 480 of the UE 120 includes a resource determination modulate configured to determine the resource via the SI, the RI bits, and the CCE index.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
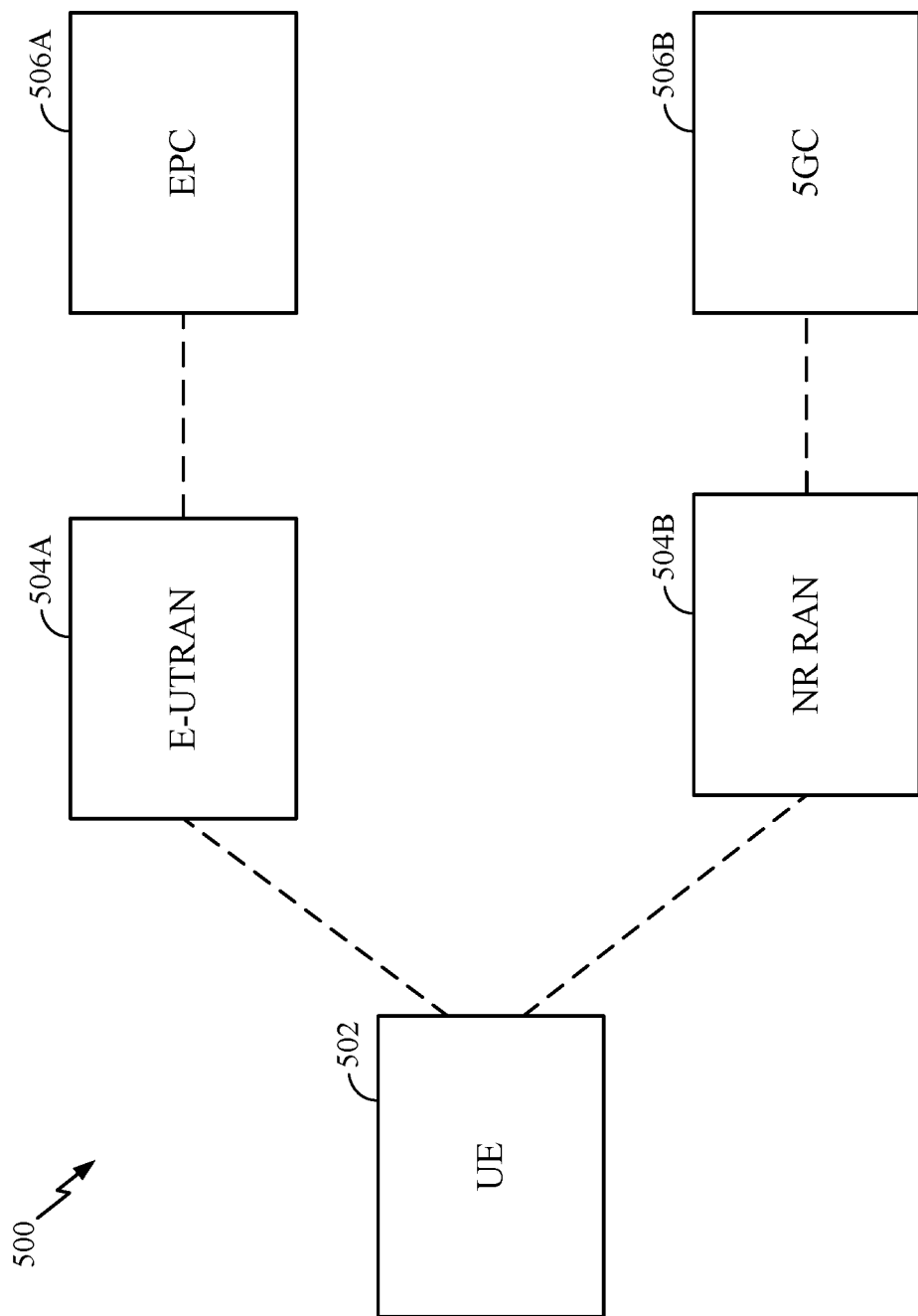
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
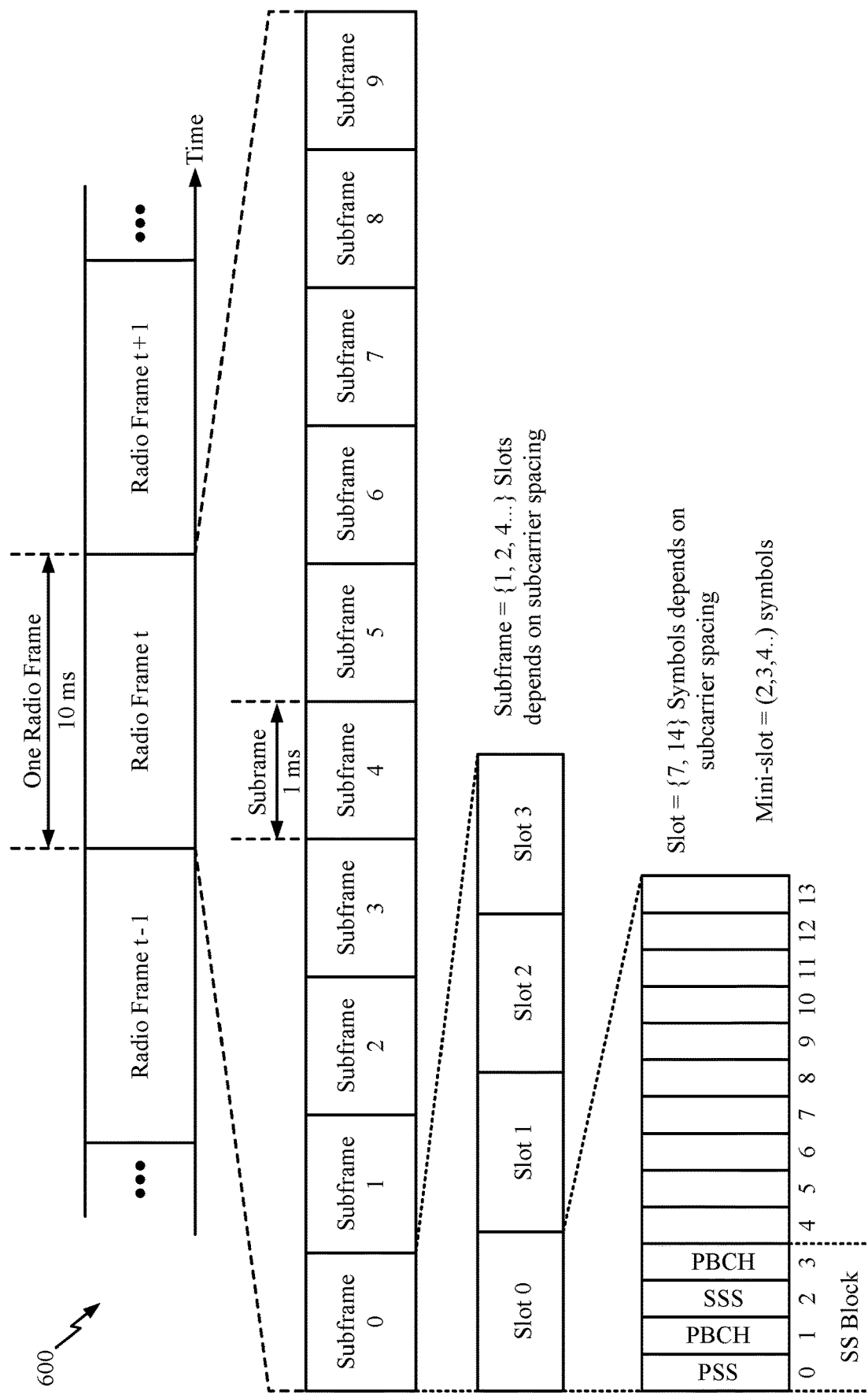
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example TTI Format

In mobile communication systems conforming to certain wireless communications standards, such as the Long Term Evolution (LTE) or 5G NR standards, certain techniques may be used to increase the reliability of data transmission. For example, after a BS performs an initial transmission operation for a specific data channel, a receiver of the transmission (e.g., a user equipment (UE)) attempts to demodulate the data channel. The demodulation may include performing a cyclic redundancy check (CRC) for the data channel. If, as a result of the CRC check, the initial transmission is successfully demodulated, the receiver may send an acknowledgement (ACK) to the BS to acknowledge the successful demodulation. If, however, the initial transmission is not successfully demodulated, the receiver may send a negative acknowledgement (NACK) to the BS.

Figure 7A:
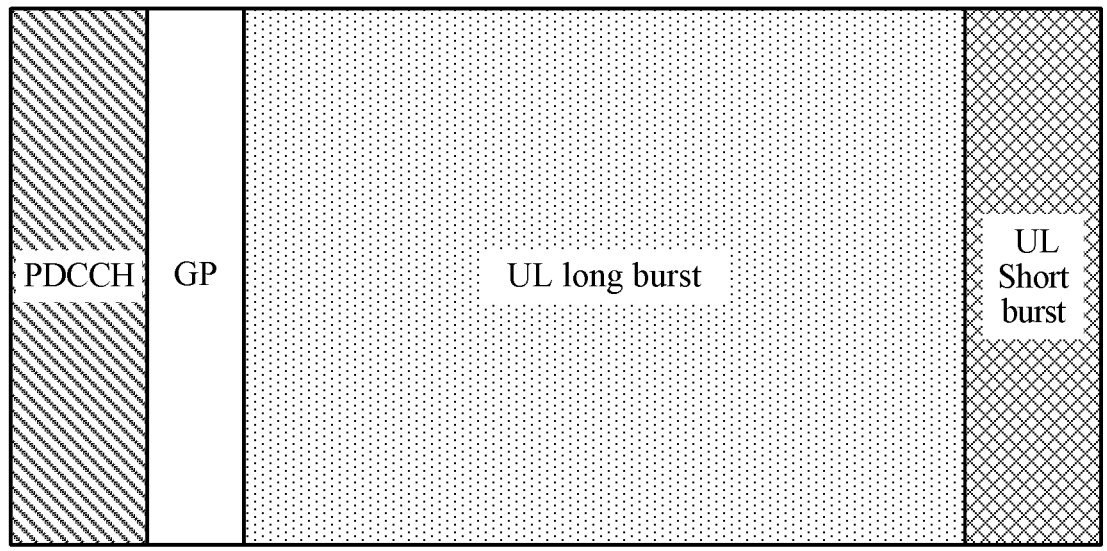
FIG. 7A illustrates an example transmission time interval (TTI) format, in accordance with certain aspects of the present disclosure.

In certain systems, such as NR, the ACK/NACK information (as well as other information) may be transmitted in an a transmission time interval (TTI), for example, as shown in FIG. 7A. A TTI can include a region for long uplink burst transmissions (i.e., the UL long burst). The long uplink burst transmissions may transmit uplink control information (UCI) such as ACK, channel quality indicator (CQI), and/or scheduling request (SR) information.

Figure 7B:
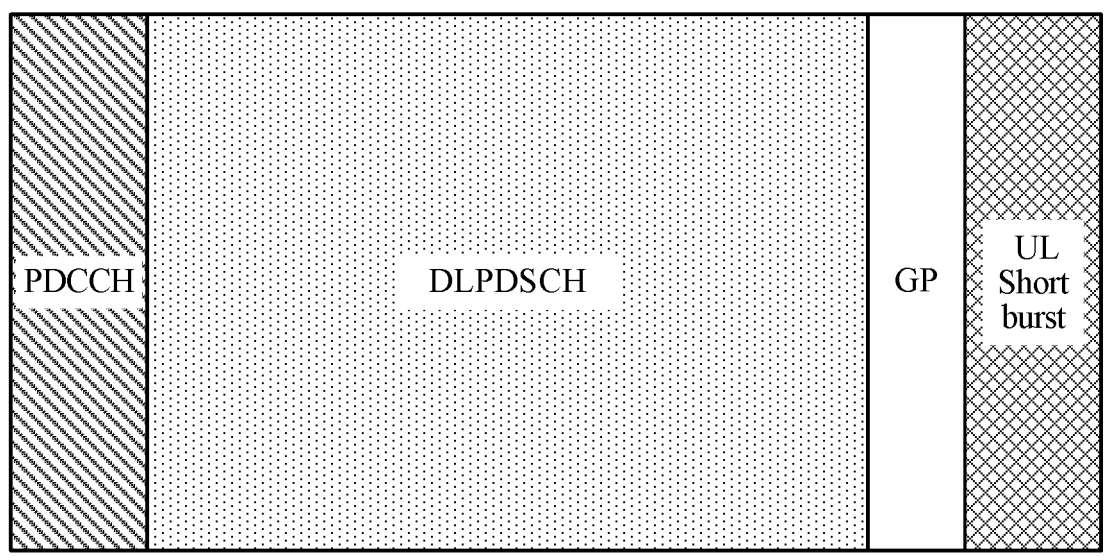
FIG. 7B illustrates another example TTI format, in accordance with certain aspects of the present disclosure.

The duration of the region for long uplink burst transmissions may vary depending on how many symbols in the TTI are used for the physical downlink control channel (PDCCH), the gap (or guard period), and the short uplink burst. For example, the long uplink burst transmission may comprise a number of slots (e.g., 4), where the duration of each slot may vary from 4 to 14 symbols. FIG. 7B shows a downlink structure has a TTI that includes PDCCH, physical downlink shared channel (PDSCH), a gap (or GP), and an uplink short burst. Similar to the UL Long Burst, the duration of the PDSCH may also depend on the number of symbols used by the PDCCH, the gap, and the uplink short burst.

As noted above, UL short burst transmission may be 1 or 2 symbols and different approaches may be used to transmit UCI in this duration. For example, according to a "1 symbol" UCI design, 3 or more bits of UCI may be sent using frequency division multiplexing (FDM). For 1 or 2 bits of ACK or a 1 bit SR, a sequence based design may be used. For example, an SR may be sent with 1 sequence, on-off keying, and may multiplex up to 12 users per RB. For a 1-bit ACK, 2 sequences may be used, and up to 6 users may be multiplexed per RB. For a 2-bit ACK, 4 sequences may be used and up to 3 users may be multiplexed per RB.

PUCCH and PUSCH from a UE that may be multiplexed. For example, the UE may transmit PUCCH and PUSCH on different RBs (e.g., FDM'd). In another example, the UE may piggyback PUCCH (e.g., UCI) on assigned PUSCH RBs. UCI resource mapping principles (e.g., around RS) can be followed, that may be common for PUSCH with DFT-s-OFDM waveform and CP-OFDM waveform. UL data may be rate-matched around the UCI (piggybacked on the PUSCH) at least for a periodic CSI report configured by RRC and/or an aperiodic CSI report triggered by UL grant.

In some examples, slot-based scheduling for HARQ-ACK with more than two bits may include PUSCH that is rate-matched. In some examples, PUSCH may be punctured for slot-based scheduling for HARQ-ACK with up to two bits. In some examples, NR may provide a sufficiently reliable common understanding on HARQ-ACK bits between the gNB and UE. In some examples, additional considerations may be taken into account regarding channel multiplexing of PUCCH and PUSCH. If PUSCH is punctured by ACK, in the case of a large ACK payload size, the impact to PUSCH decoding performance may be non-negligible. If PUSCH is rate-matched around ACK, in cases where a UE misdetects DCI, the BS and UE may have different assumptions on the number of ACK bits piggybacked on PUSCH, thus, the eNB may perform blind detection to resolve the ambiguity. Further, as the ACK payload size increases, a number of blind detections that the BS may need to perform may also increase. Therefore, piggyback rules may be desirable, for example, to address the above scenarios.

Example PUCCH Resource Allocation

In some cases, to signal a resource or resources available for sending uplink control information (UCI), such as ACK/NACK feedback, service requests (SR), etc., a BS may use allocation resource indicator (ARI) bits. The ARI bits may explicitly indicate PUCCH resources available for transmitting UCI. For example, a 2-bit ARI may indicate one of four resources available for transmitting UCI. However, in some cases, there may be more sets of resources available than can be explicitly signaled with the number of ARI bits. For example, if there are more than four sets of resources, a 2-bit ARI may be insufficient to indicate the available resource set. In some examples, an implicit mapping for PUCCH resource allocation may be used to indicate the resources. The number of PUCCH resources in a resource set may be configurable.

Figure 8:
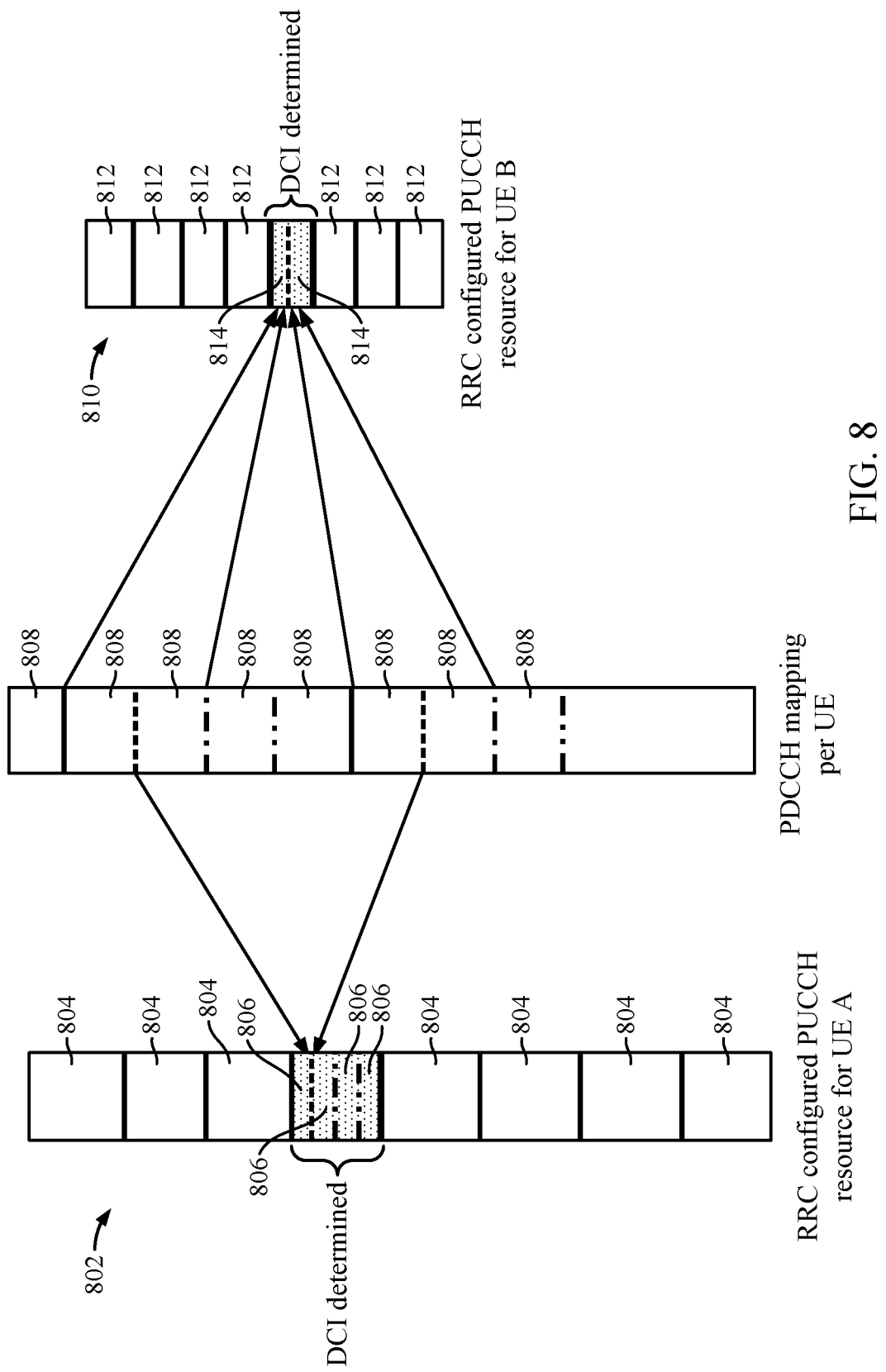
FIG. 8 illustrates an example of resource allocation for a physical uplink control channel (PUCCH) transmission.

FIG. 8 illustrates an example of resource allocation for a physical uplink control channel (PUCCH) transmission. For example, FIG. 8 shows different sets of resources (e.g., time resources, frequency resources, etc.) available for PUCCH transmission. Different UEs may be configured with different resource sets (e.g., via higher layer RRC signaling). Explicit signaling (e.g., ARI bits) may be used to signal one of the configured sets of resources, and implicit mapping may be used to identify resources within the set.

As shown in FIG. 8, a configuration 802 of eight PUCCH resources sets 804 may be configured for a first UE A and a configuration of eight PUCCH resource sets 812 may be configured for a second UE B. Each set of resources 802 are divided into the subsets of resources 806 and each set of resources 812 are divided into subsets of resources 814. In FIG. 8, each set of resources 806 includes four resources per subset, while each set of resources 814 includes two resources per subset. The configurations 802, 810 may be divided into a different numbers of sets and/or subsets of resources 804, 806, 812, and 814. The size of a subset of resources 806/814 may correspond to the number of PUCCH resources in the subset. Each subset of resources for a given UE (e.g., subsets 806 or subsets 814) has the same size. At least two different subsets of a given UE can have a different size. At least two different UEs can have subsets of different sizes. UEs can have subsets of the same size.

FIG. 8 further illustrates a set of PDCCH resources including a plurality of PDCCH resources 808. The PDCCH resources 808 map to PUCCH resources 806 and 814. The PDCCH resources 808 used for transmission by BS to UE A and UE B on the DL are mapped to PUCCH resources used for transmission by UE A and UE B to BS on the UL. The BS may decide what to include in the PDCCH resources 808 to indicate information to the UEs the PUCCH resources to use. Thus, a given UE may determine which PUCCH resources to use for transmission based on which PDCCH resources 808 the UE receives transmissions, and/or based on the information in the transmissions.

The BS can explicitly signal in the PDCCH which resources (e.g., time resources, frequency resources, etc.) of the configured PUCCH resources to use for transmitting UCI. However, such signaling may require a large number of bits, which may be inefficient. For the example shown in FIG. 8, the configuration of PUCCH resources 802 includes 32 PUCCH resources 806, requiring 5-bits to explicitly signal. Such explicit signaling utilizes network bandwidth and increases network overhead, thereby reducing overall data throughput.

To reduce overhead of explicit signaling, a partially implicit mapping to UL resources on the PUCCH for communicating the UCI on the PUCCH may be used. Both the UE and BS may perform the implicit mapping. The UE use the partially implicit mapping to determine which PUCCH resources to use to transmit the UCI and the BS can use the partially implicit mapping to monitor/receive the UCI and/or to determine which data transmission the UCI is for based on the PUCCH resources on which it is received.

The BS may transmit DCI with one or more RI bits to indicate a subset of resources available for transmitting UCI in a PUCCH transmission. The RI bits may accordingly be used to explicitly map to a particular subset of resources 86/814 of a set of PUCCH resources 804/812 associated with the UE A or UE B that the DCI is sent to (i.e., intended for).

The PDCCH may span a number of subcarriers in the frequency domain and a number of OFDM symbols in the time domain. The minimum resource element of a PDCCH may be referred to as a resource element (RE) and correspond to one OFDM symbol and one subcarrier. REs may be grouped into resource element groups (REGs). Each REG may include a number of (e.g., 4 consecutive) REs within the same OFDM symbol and the same resource block (RB). REGs may be grouped into control channel elements (CCEs). Each CCE may include a number of (e.g., 9 contiguous) REGs. The CCEs in the PDCCH may be indexed and each CCE referenced by index number corresponding to the position of the CCE in the PDCCH. Accordingly, the DCI transmission by the BS 110 may be carried in a particular CCE of a PDCCH, the CCE having a particular index. The CCE index of the CCE carrying the DCI may be used to implicitly map to a particular PUCCH resource 822/824 in the subset of resources 812/814 indicated by the DCI.

If there are X number of RI bits signaled to the UE by the BS (e.g., in DCI of a PDCCH), and there are Y number of PUCCH resources that the UE is configured (e.g., using RRC) to use for one set of PUCCH resources, then there may be $2^x$ subsets of resources indicated by the RI bits. If $Y/2^x$ is not an integer, then different subsets may have a different size. If $Z=Y \% 2^x$ and $M=\text{floor}(Y/2^x)$, then there may be $2^x-Z$ subsets with M PUCCH resources, and Z subsets with M+1 PUCCH resources.

The Y resources may be divided into $2^x$ subsets of resources as follows: 1) for the first Z subsets each has M+1 resources; and 2) the remaining subsets each have M resources. The Y resources may be divided into $2^x$ subsets of resources as follows: 1) the first $2^x-Z$ subsets each have M PUCCH resources; and 2) the remaining subsets each have M+1 PUCCH resources.

ABS (e.g., BS 110) and UE (e.g., UE 120) may support carrier aggregation (CA), meaning the BS and UE can communicate over multiple frequencies (e.g., multiple ranges of frequencies of one or more bandwidths) referred to as carriers, or component carriers (CCs). These carriers may or may not be contiguous in frequency. When CA is used by the BS, the BS may support a plurality of serving cells, one for each carrier. The coverage area of each serving cell may differ. In certain aspects, radio resource control (RRC) connection procedures (e.g., during handover, after a radio link failure (RLF), for initial connection, etc.) for the UE connecting to the BS are handled by the BS using only one of the carriers (referred to as a primary carrier), which serves one of the cells referred to as the primary cell (PCell). The remaining cells may be referred to as secondary cells (SCells) and are served by the remaining carriers (referred to as secondary carriers).

PDCCH is carried on multiple CCs (e.g., each CC). Accordingly, if there are multiple CCs used for communication between the BS and a UE, there may be multiple PDCCHs transmitted on multiple CCs (e.g., a PDCCH on each CC) from BS to UE. Only one of the multiple PDCCHs may be used to map to PUCCH resources. The other PDCCHs are ignored (e.g., any RI bits and CCE index of the CCE carrying the RI bits in the other PDCCHs are ignored and not used to map to PUCCH resources). The PDCCH carried on the CC with the smallest/lowest index is used to map to PUCCH resources using the techniques described herein. The PDCCH carried on the CC with the largest/highest index is used to map to PUCCH resources using the techniques described herein. The UCI for the multiple PDCCH are transmitted in the same UL slot.

Similarly, to how multiple PDCCHs may be transmitted from BS to UE using multiple CCs, multiple PDCCHs may be transmitted from BS to UE on multiple slots (e.g., time slots when using cross slot scheduling). Accordingly, there may be multiple ACK bits transmitted on the same UL slot. Only one of the multiple PDCCHs may be used to map to PUCCH resources. The other PDCCHs are ignored (e.g., any RI bits and CCE index of the CCE carrying the RI bits in the other PDCCHs are ignored and not used to map to PUCCH resources). The PDCCH received at the UE (e.g., transmitted by the BS) in the most recent/last slot in time is used to map to PUCCH resources using the techniques described herein. The UCI for the multiple PDCCH are transmitted in the same UL slot.

UE may be configured to transmit a scheduling request (SR) to BS to send an UL grant to the UE for the UE to transmit (e.g., on PUSCH). The SR may have a periodicity that is small (e.g., less than slot duration, such as 1, 2, or 3 symbols). Accordingly, a positive SR may show up (e.g., need to be transmitted by the UE) in the middle of or during a long PUCCH or PUSCH transmission from the UE. Such a SR may be for an ultra-reliable low latency communications (URLLC) UE, for an enhanced mobile broadband (eMBB) UE, or for a UE that supports eMBB and URLLC.

If there is a long PUCCH (e.g., for URLLC or eMMB)/PUSCH transmitted by the UE and a SR shows up, the UE may drop the long PUCCH/PUSCH from that SR symbol. For example, the UE may transmit PUCCH/PUSCH in symbols up until the SR symbol, and then not transmit PUCCH/PUSCH on the remaining symbols. If a SR symbol (e.g., for URLLC) shows up during PUSCH or PUCCH transmission (e.g., for eMMB) at a given UE, the UE may drop the long PUCCH/PUSCH from that SR symbol to yield to URLLC. When the UE transmits ACK (e.g., or UCI) on PUSCH, for 1 or 2 bits of ACK, the ACK bits may puncture PUSCH. For ACK>2 bits, ACK bits are rate matched around by the PUSCH. The BS may include in the UL grant to the UE downlink assignment index (DAI) bits (e.g., 2 or 3) to indicate the number of ACK bits the UE should transmit on PUSCH.

The UE and BS may be configured with a semi-static HARQ-ACK codebook size. For example, when transmitting ACK the UE may be configured to always transmit X (e.g., 4) number of bits. The HARQ-ACK payload size may be configured in RRC signaling from the BS to the UE. When using a semi-static HARQ-ACK codebook size, 1 DAI bit may be added to the UL grant to indicate if ACK bits are expected or not. If no DAI bits may be added to the UL grant, the BS may do blind detection on the two hypothesis and the correct hypothesis is then used by the BS to get the data and ACK bits (if present).

As discussed in more detail below, in some cases, the BS uses 3 ARI bits and 4 RMSI bits. In some cases there are 16 resource sets, each containing 16 resources available for PUCCH resource allocation. In some cases, PUCCH resource allocation is before RRC setup.

Example PUCCH Resource Allocation Before RRC Setup

A base station (BS) may signal resources available to a user equipment (UE) for sending uplink control information (UCI) such as hybrid automatic repeat request (HARQ) feedback (e.g., ACK/NACK information) and/or scheduling requests (SR), for example, in a physical uplink control channel (PUCCH). Before radio resource control (RRC) setup, the UE does not have a dedicated PUCCH resource configuration.

Aspects of the present disclosure relate to methods and apparatus relating to techniques for determining resources allocated for transmitting UCI in a PUCCH. Techniques are provided for PUCCH resource allocation before RRC connection setup is completed.

In some examples, a single-bit HARQ-ACK, format 0 or format 1, may be configured. In some examples, a 2-symbol PUCCH duration starting from symbol #12 and a 14-symbol PUCCH duration starting from symbol #0 may be configured. For the HARQ-ACK resource allocation, additional PUCCH durations may include a 4-symbol PUCCH duration starting from symbol #10 and a 10-symbol PUCCH duration starting from symbol #4. In some examples, for HARQ-ACK resource allocation before the UE has a dedicated PUCCH configuration (i.e., before RRC connection setup is completed), frequency hopping is enabled for PUCCH transmission for FR1 (e.g., sub-6 GHz frequency region) and FR2 (e.g., frequency region beyond 6 GHz or millimeter wave (mmW)).

According to certain aspects, a plurality of resource sets may be predefined for PUCCH resource allocation. For example, 16 resource sets may be predefined. The resource sets can be mapped to remaining system information (RMSI) bit values according to a mapping table. Each resource set may include a plurality of resources. For example, each resource set may include 16 resources. In some examples, the BS signals RMSI bits. The BS may signal the RMSI in a system information block (SIB). The value of the RMSI bits may indicate to a user equipment (UE), or set of UEs, one of the configured resource sets is available for the UE, or UEs, to use for PUCCH according to the mapping table for the RMSI. For example, the BS can signal 4 bits RMSI to indicate one of the 16 configured resource sets.

FIG. 9 is a table 900 illustrating an example mapping of RMSI to allocated resource sets for PUCCH before RRC setup, in accordance with certain aspects of the present disclosure. As shown, the table 900 includes 16 rows for the 16 possible RMSI values, each RMSI value corresponding to one resource set (of the 16 resource sets) and each resource set containing 16 resources.

As shown in table 900, each resource set (i.e., row) can be mapped to a starting symbol and a number of symbols (i.e., Duration), a repetition factor, RB index of the first hop, initial shift index per RB, and the orthogonal cover code (OCC) index (e.g., spreading) per RB. As shown in table 900, each resource set may have the 2-symbol, 4-symbol, 10-symbol, or 14-symbol duration. To match LTE coverage with 30 kHz, for example, a repetition factor of 2 can be used for some resource sets (e.g., sets 10-13 as shown in table 900). Since PRB indices are determined based on the 3 bits ARI and 4 bits RMSI, there may be at most 8 RBs once the RMSI value are given. Thus, as shown in the table 900, each RB index of the first hop, has (e.g., is restricted to) 2, 4, or 8 RBs. The OCC index has no value, 1 value (e.g., 0), or 2 values (e.g., 0,1). The number of resources per resource set in one row is the product of the number of RBs, the number of usable shifts, and the number of OCCs, and is equal to 16 resources in each resource set. In some examples, as shown in table 900, the rows 14 and 15 may be reserved. N is the bandwidth of the initial access uplink bandwidth part (BWP). When intra-slot frequency hopping is enabled, the RB index of the second hop follows a mirror-hopping rule within the initial access UL BWP. For example, if the RB index of the first hop is in, the RB index of the second hop will be N−1−m. The second hop can therefore be determined based on the first hop.

Although table 900 shows one example mapping for the RMSI values to various parameters and/or values for the resource sets. Other mappings may be used, involving different parameters, values, and/or different combinations of the parameters and/or values shown in table 900.

According to certain aspects, the RBs used for PUCCH transmission may be placed to the edge of system if possible.

According to certain aspects, the BS can indicate the resource (e.g., the physical resource block (PRB) index), from the plurality of resources within the resource set selected (e.g., indicated) by the RMSI bits and the associated mapping. For example, the BS can signal the resource using allocation resource indicator (ARI) bits and an implicit mapping function. For example, the ARI bits may select a resource subset and a control channel element (CCE) index may select a resource within the resource subset. In some examples, the BS can signal the resource via the ARI bits and a CCE index according to an ARI value mapping table. In some examples, the BS signals the resource using 3 ARI bits. For each resource set indicated by the RMSI, there will be an ARI mapping table. Thus, for 16 configured resource sets, there are a total of 16 ARI mapping tables. The 16 ARI mappings tables are the ARI values corresponding to each of the 16 RMSI values (resource sets) with an explicit indication and an implicit function, as described in more detail below.

In some examples, the ARI bits may indicate the information in the following order: RB index, OCC index, and shift index. The ARI bits may explicitly indicate the RB index and the OCC index. The shift index may be determined implicitly in addition to ARI indication. The resource index mapping table may vary for each RMSI value. For example, each RMSI value/resource set may be associated with a different ARI mapping table.

FIG. 10 is a table 1000 illustrating an example mapping of ARI to allocated resources, with a resource set, for PUCCH, in accordance with certain aspects of the present disclosure. The table 1000 shows an example mapping for the ARI values and relative resource index corresponding to the RMSI value 4 in the table 900. As discussed above, each of the RMSI values, for example each of the 16 RMSI values shown in table 900, is associated with a respective ARI mapping table. Although table 1000 shows one example mapping for the ARI values to various parameters and/or values for the resource sets. Other mappings may be used, involving different parameters, values, and/or different combinations of the parameters and/or values shown in table 1000.

As shown in the table 1000, the 3-bit ARI can take 8 values (0-7). The 16 resources within the selected resource set may be further divided into 8 resource subsets each correspond to one of the 8 ARI values. There are 2 resources within each resource subset. The relative resource index within the resource subset may have two values (e.g., 0 and 1). The relative resource index within the resource subset is obtained from an implicit mapping function (e.g., from the starting CCE index of the PDCCH). The table 1000 includes the ARI values, the relative resource index in the subset, the RB index, the OCC index, and the shift index. The ARI bit can explicitly indicate the RB index and the OCC index, while the shift index may be implicit derived in addition to ARI indication. The same mapping function (e.g., an implicit control channel element (CCE) mapping function) can be used to derive the relative resource index as the PUCCH resource allocation after RRC setup.

According to certain aspects, instead of defining each ARI mapping table for each row in Table 900 (resource set), functions can be specified (e.g., configured) to determine the RB index, initial shift index, and OCC index based on the number of RBs, the number of initial shifts, the number of OCCs, ARI values, and the relative resource index within the subset. For example, for a row with $N_{RB}$ RBs, $N_{cs}$ initial shifts, and $N_{OCC}$ OCCs, an ARI value i and relative resource index r, the corresponding relative RB index $n_{RB}$, relative initial shift index $n_{cs}$, and relative OCC index $n_{occ}$ can be derived with the following formulas:

$$n_{RB} = \text{floor}\left(\frac{i\,N_{RB}}{8}\right)$$

$$n_{occ} = \text{floor}\left(\frac{\left(i\,\%\,\frac{8}{N_{RB}}\right)N_{OCC}N_{RB}}{8}\right)$$

$$n_{cs} = 2\left(i\,\%\,\frac{8}{n_{RB}N_{OCC}}\right) + r$$

The relative RB index $n_{RB}$, relative initial shift index $n_{cs}$, and the relative OCC index $n_{occ}$ are all defined the corresponding RB index set, initial shift index set, and the OCC index set given in the RMSI mapping table. For example, for the eighth row (i.e., RMSI value 8), $n_{RB}$=3 means the actual RB index=N−2, and $n_{RB}$=1 means the actual initial shift index 6.

Figure 11:
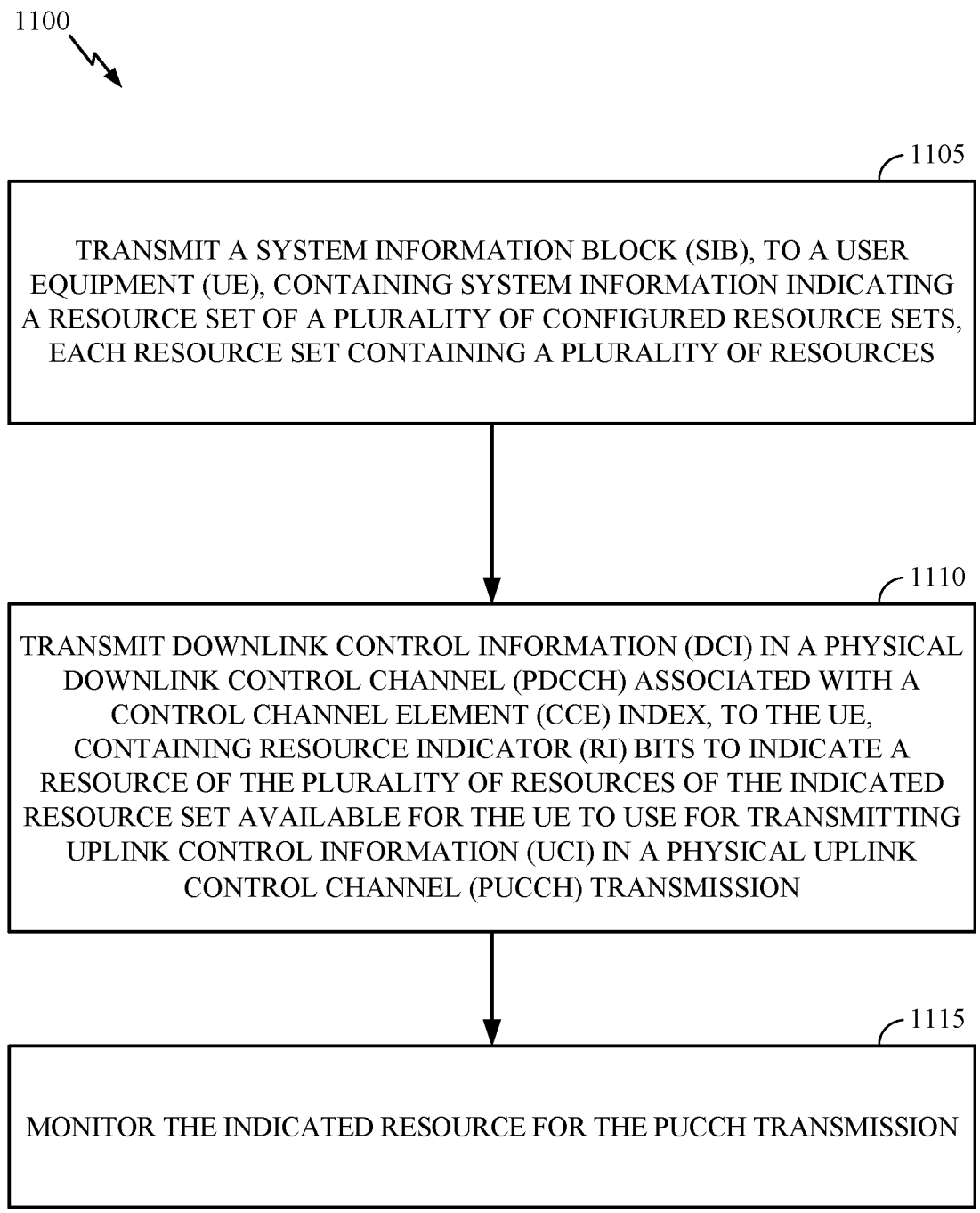
FIG. 11 is a flow diagram illustrating example operations for wireless communications by a BS, in accordance with certain aspects of the present disclosure.

FIG. 11 is a flow diagram illustrating example operations 1100 for wireless communications by a BS (e.g., such as a BS 110 in the wireless communication network 100 in FIG. 1), in accordance with certain aspects of the present disclosure. Operations 1100 may be implemented as software components that are executed and run on one or more processors (e.g., processor 440 of FIG. 4). Further, the transmission and reception of signals by the BS in operations 1100 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

The operations 1100 begin, at 1102, by transmitting a SIB to a UE (e.g., such as a UE 120 in FIG. 1), containing SI (e.g., 4 bits RMSI) indicating a resource set of a plurality of predefined resource sets. Each resource set contains a plurality (e.g., 16) of resources. The indicated resource set may correspond to a value of the RMSI bits based on an associated mapping. The associated mapping may map each value of the RMSI bits to a duration of the PUCCH transmission, a RB index, an initial shift index per RB, and/or an OCC index per RB. The duration may be 2 symbols, 4 symbols, 10 symbols, or 14 symbols. The RB index may indicate 2, 4, or 8 RBs. The OCC index may indicate 1 or 2 OCCs. The RB index may be for a first hop of a frequency hopping pattern.

At 1104, the BS transmits DCI, in a PDCCH associated with a control channel element (CCE) index, to the UE containing RI bits (e.g., 3 ARI bits) to indicate a resource of the plurality of resources of the indicated resource set available for the UE to use for transmitting UCI in a PUCCH transmission. The resource may be indicated based on an explicit indication via the RI bits and implicit mapping. Each of the plurality of resource sets may be associated with a different implicit mapping. Each resource in a resource set may be mapped to a value of the RI bits, a relative resource index, an RB index, an OCC index, and a shift index. The RI bits may explicitly indicate the RB index and the OCC index. The shift index may be implicitly derived based on the relative resource index.

At 1106, the BS monitors the indicated resource for the PUCCH transmission.

Figure 12:
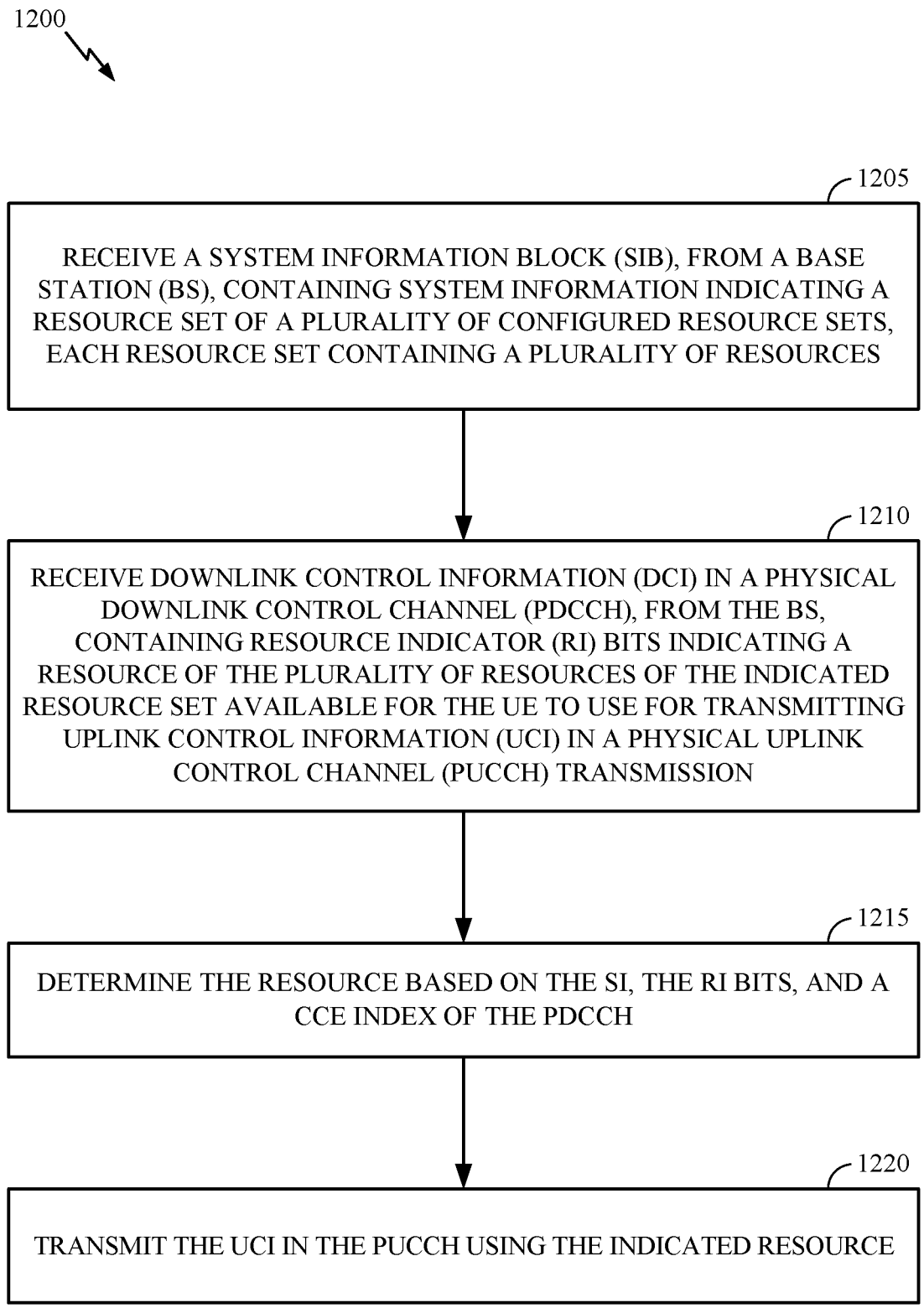
FIG. 12 is a flow diagram illustrating example operations for wireless communications by a UE, in accordance with certain aspects of the present disclosure.

FIG. 12 is a flow diagram illustrating example operations 1200 for wireless communications by a UE (e.g., a UE 120 in the wireless communication network 100 in FIG. 1), in accordance with certain aspects of the present disclosure. The operations 1200 may be complementary operations by the UE to the operations 1100 by the BS. Operations 1200 may be implemented as software components that are executed and run on one or more processors (e.g., processor 480 of FIG. 4). Further, the transmission and reception of signals by the UE in operations 1200 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

The operations 1200 may begin, at 1202, by receiving a SIB from a BS containing SI indicating a resource set of a plurality of configured resource sets. Each resource set contains a plurality of resources.

At 1204, the UE receives DCI, in a PDCCH (e.g., associated with a CCE index), from the BS containing RI bits indicating a resource of the plurality of resources of the indicated resource set available for the UE to use for transmitting UCI in a PUCCH transmission.

At 1206, the UE determines the resource based on the SI, the RI bits, and the CCE index. For example, the UE determines the resource set based on the RMSI bits in the SI and the RMSI mapping table and the UE determine the resource within the resource set based on the ARI bits in the DCI, the CCE index of the PDCCH, and the ARI mapping table.

At 1208, the UE transmits the UCI in the PUCCH using the determined resource.

Figure 13:
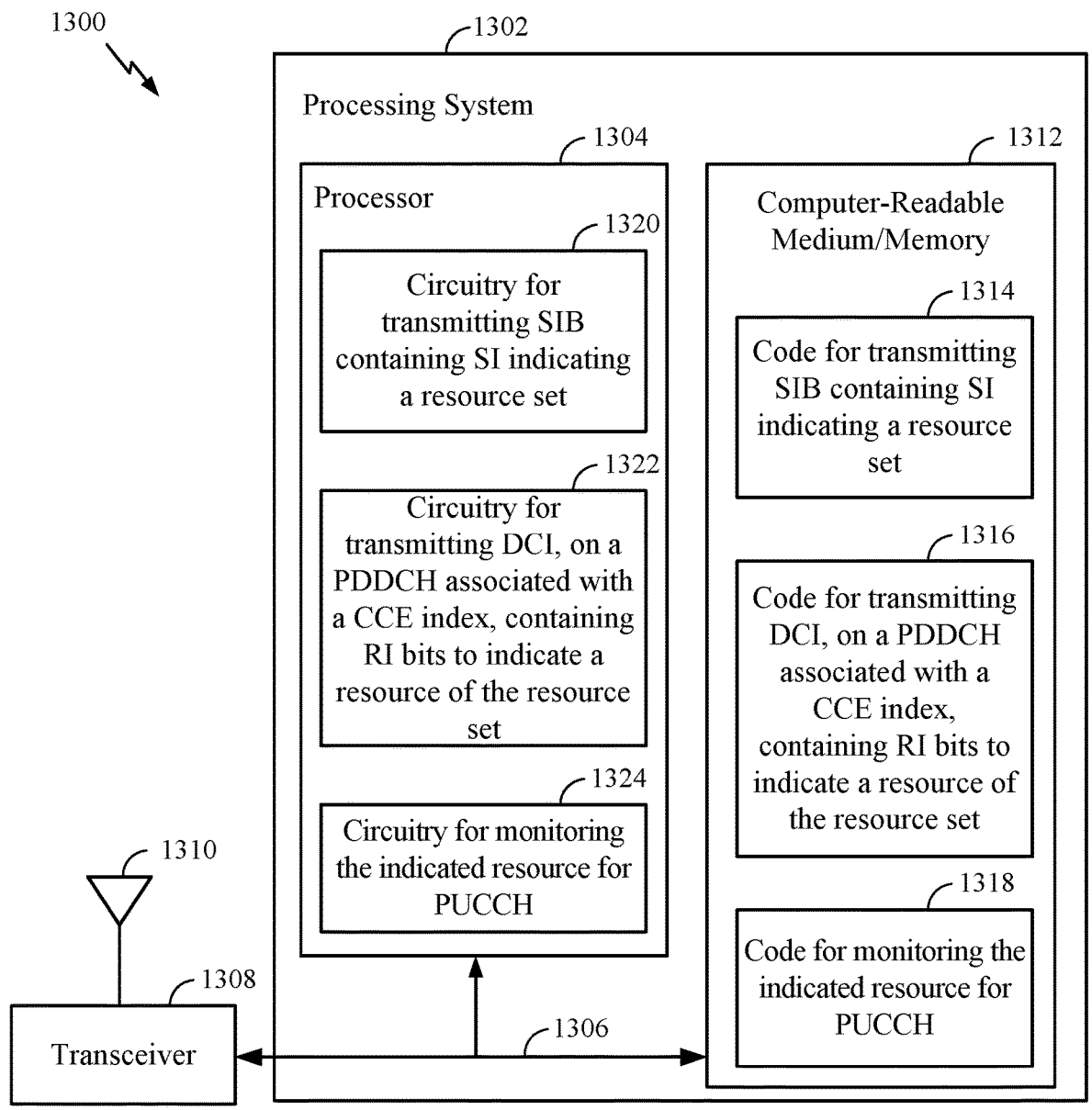
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer executable code) that when executed by the processor 1304, cause the processor 1304 to perform the operations illustrated in FIG. 11, or other operations for performing the various techniques discussed herein for PUCCH resource allocation before RRC setup. In certain aspects, computer-readable medium/memory 1312 stores code 1314 for transmitting SIB including SI indicating a resource set; code 1316 for transmitting DCI, in a PDCCH associated with a CCE index, containing RI bits indicating a resource from the indicated resource set; and code 1318 for monitoring the indicated resource for UCI in PUCCH. In certain aspects, the processor 1304 has circuitry configured to implement the code stored in the computer-readable medium/memory 1312. The processor 1304 includes circuitry 1320 for transmitting SIB including SI indicating a resource set; circuitry 1322 for transmitting DCI, in a PDCCH associated with a CCE index, containing RI bits indicating a resource from the indicated resource set; and circuitry 1324 for monitoring the indicated resource for UCI in PUCCH.

Figure 14:
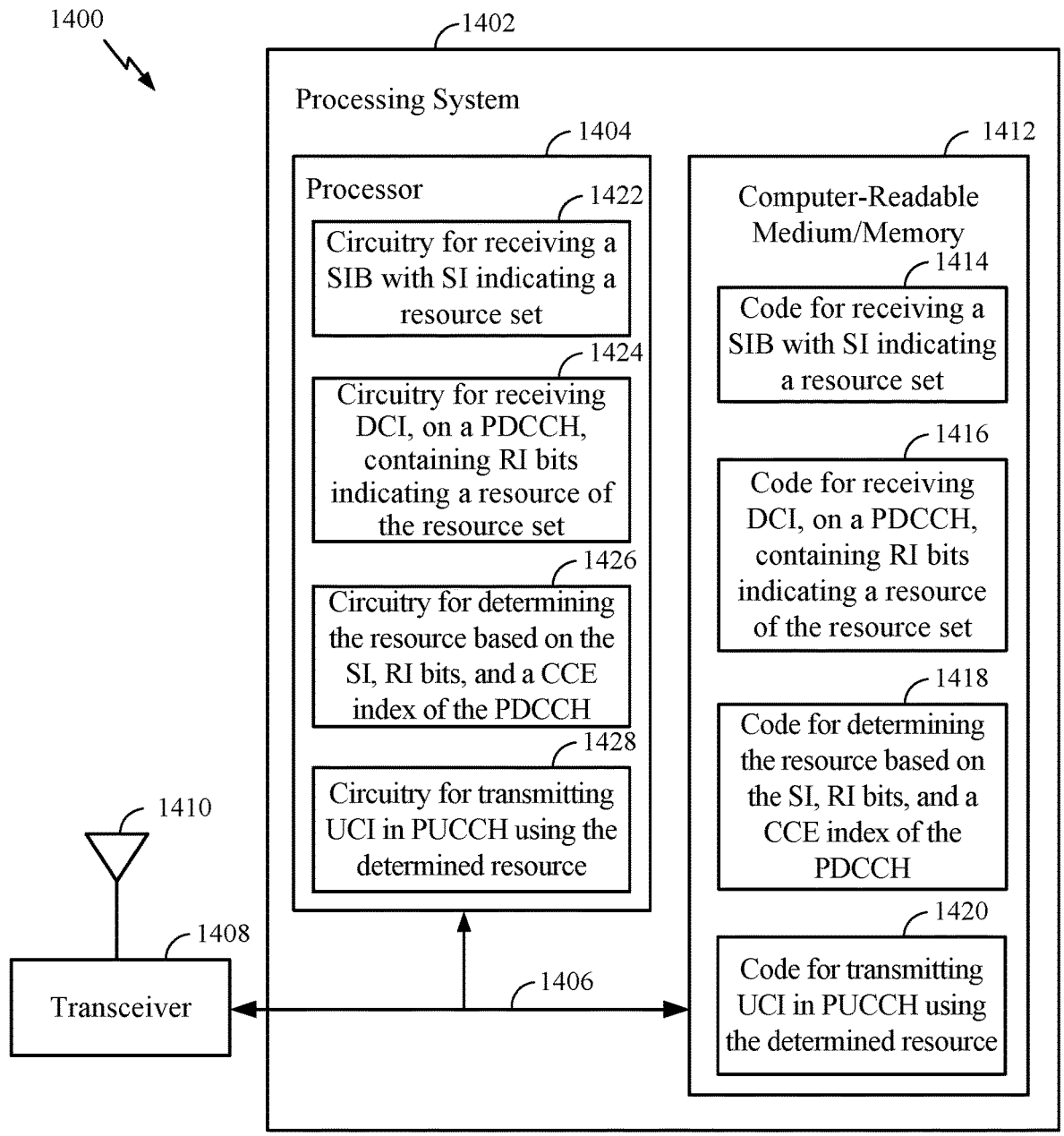
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 12. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer executable code) that when executed by the processor 1404, cause the processor 1404 to perform the operations illustrated in FIG. 12, or other operations for performing the various techniques discussed herein for PUCCH resource allocation before RRC setup. In certain aspects, computer-readable medium/memory 1412 stores code 1414 for receiving SIB including SI indicating a resource set; code 1416 for receiving DCI, in a PDCCH associated with a CCE index, containing RI bits indicating a resource from the indicated resource set; code 1418 for determining the resource based on the SI, the RI bits, and the CCE index of the PDCCH; and code 1420 for transmitting UCI in PUCCH using the determined resource. In certain aspects, the processor 1404 has circuitry configured to implement the code stored in the computer-readable medium/memory 1412. The processor 1404 includes circuitry 1422 for receiving SIB including SI indicating a resource set; circuitry 1424 for receiving DCI, in a PDCCH associated with a CCE index, containing RI bits indicating a resource from the indicated resource set; circuitry 1426 for determining the resource based on the SI, the RI bits, and the CCE index of the PDCCH; and circuitry 1428 for transmitting UCI in PUCCH using the determined resource.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a system information block (SIB) containing system information, wherein values of bits of the system information indicate a resource set of sixteen configured resource sets, each resource set containing sixteen resources for physical uplink control channel (PUCCH) transmission, wherein the values of the bits of the system information map to a number of symbols, a first symbol, and a set of one or more initial cyclic shift (CS) indexes corresponding to the indicated resource set, and wherein the values of the bits of the system information further indicate a set of repetition factors for the PUCCH transmission, a set of RB indexes and a set of one or more orthogonal cover code (OCC) indexes for the PUCCH transmission;
   receiving downlink control information (DCI) in a physical downlink control channel (PDCCH) containing resource indicator (RI) bits;
   determining a resource index, r, corresponding to one of the sixteen resources of the indicated resource set based on an explicit value of the RI bits and on a control channel element (CCE) index of the PDCCH; and
   transmitting uplink control information (UCI) in the PUCCH using the one of the sixteen resources.

2. The method of claim 1, wherein the system information is received via remaining system information (RMSI) bits.

3. The method of claim 2, wherein:
   the RMSI bit comprise 4 bits, and
   the RI bits comprise 3 bits.

4. The method of claim 1, wherein at least one of:
   the set of RB indexes for the sixteen resource sets comprises sets of 2 RBs, 4 RBs, and 8 RBs, or
   the set of OCC indexes indicates 1 or 2 OCCs.

5. The method of claim 1, wherein:
   a first RB index is for a first hop of a frequency hopping pattern, and
   the method further comprises determining a second RB index for a second hop of the frequency hopping pattern based on the frequency hopping pattern and the first RB index for the first hop.

6. The method of claim 1, wherein:
   determining the resource index is based on a function of the values of the RI bits and the CCE index.

7. The method of claim 1, further comprising:
   determining one or more relative resource indexes; and
   deriving one or more of the set of one or more initial CS indexes implicitly based on the relative resource indexes.

8. The method of claim 1, wherein the one of the sixteen resources is at an edge of a system bandwidth.

9. A method for wireless communications by a base station (BS), comprising:
   transmitting a system information block (SIB), to a user equipment (UE), containing system information, wherein values of bits of the system information indicate a resource set of a-sixteen configured resource sets, each resource set containing sixteen resources for physical uplink control channel (PUCCH) transmission, wherein the values of the bits of the system information map to a number of symbols, a first symbol, and a set of one or more initial cyclic shift (CS)

indexes corresponding to the indicated resource set, and wherein the values of the bits of the system information further indicate a set of repetition factors for the PUCCH transmission, a set of RB indexes and a set of one or more orthogonal cover code (OCC) indexes for the PUCCH transmission;

transmitting downlink control information (DCI) on physical downlink control channel (PDCCH) associated with a control channel element (CCE) index, to the UE, containing resource indicator (RI) bits, wherein the CCE index and an explicit value of the RI bits together indicate a resource index, r, corresponding to one of the sixteen resources of the indicated resource set available for the UE to use for transmitting uplink control information (UCI) in the PUCCH transmission; and monitoring the one of the sixteen resources for the PUCCH transmission.

10. The method of claim 9, wherein the system information is provided via remaining system information (RMSI) bits.

11. The method of claim 10, wherein:
the RMSI bits comprise 4 bits, and
the RI bits comprise 3 bits.

12. The method of claim 9, wherein at least one of:
the set of RB indexes for the sixteen resource sets comprises sets of 2 RBs, 4 RBs, and 8 RBs, or
the set of one or more OCC indexes indicates 1 or 2 OCCs.

13. The method of claim 9, wherein:
a first RB index is for a first hop of a frequency hopping pattern, and
a second RB index is for a second hop of the frequency hopping pattern based on the frequency hopping pattern and the first RB index for the first hop.

14. The method of claim 9, wherein:
the resource index is indicated via a function of the values of the RI bits and the CCE index.

15. The method of claim 14, wherein:
the CS index is implicitly derived based on one or more relative resource indexes.

16. The method of claim 9, wherein the one of the sixteen resources is at an edge of a system bandwidth.

17. An apparatus for wireless communications, comprising:
at least one processor; and
a memory coupled to the at least one processor, the memory comprising code executable by the at least one processor to cause the apparatus to:
receive a system information block (SIB) containing system information, wherein values of bits of the system information indicate a resource set of sixteen configured resource sets, each resource set containing sixteen resources for physical uplink control channel (PUCCH) transmission, wherein the values of the bits of the system information map to a number of symbols, a first symbol, and a set of one or more initial cyclic shift (CS) indexes corresponding to the indicated resource set, and wherein the values of the bits of the system information further indicate a set of repetition factors for the PUCCH transmission, a set of RB indexes and a set of one or more orthogonal cover code (OCC) indexes for the PUCCH transmission;
receive downlink control information (DCI) in a physical downlink control channel (PDCCH) containing resource indicator (RI) bits;
determine a resource index, r, corresponding to one of the sixteen resources of the indicated resource set based on an explicit value of the RI bits and on a control channel element (CCE) index of the PDCCH; and
transmit uplink control information (UCI) in the PUCCH using the one of the sixteen resources.

18. The apparatus of claim 17, wherein the system information is received via remaining system information (RMSI) bits.

19. The apparatus of claim 18, wherein:
the RMSI bit comprise 4 bits, and
the RI bits comprise 3 bits.

20. The apparatus of claim 17, wherein at least one of:
the set of RB indexes for the sixteen resource sets comprises sets of 2 RBs, 4 RBs, and 8 RBs, or
the set of OCC indexes indicates 1 or 2 OCCs.

21. The apparatus of claim 17, wherein:
a first RB index is for a first hop of a frequency hopping pattern, and
the code is further executable by the at least one processor to cause the apparatus to determine a second RB index for a second hop of the frequency hopping pattern based on the frequency hopping pattern and the first RB index for the first hop.

22. The apparatus of claim 17, wherein:
the code executable by the at least one processor to cause the apparatus to determine the resource index comprises code executable by the at least one processor to cause the apparatus to determine the resource index based on a function of the values of the RI bits and the CCE index.

23. The apparatus of claim 17, wherein the code is further executable by the at least one processor to cause the apparatus to:
determine one or more relative resource indexes; and
derive one or more of the set of one or more initial CS indexes implicitly based on the relative resource indexes.

24. The apparatus of claim 17, wherein the one of the sixteen resources is at an edge of a system bandwidth.

25. An apparatus for wireless communications, comprising:
at least one processor; and
a memory coupled to the at least one processor, the memory comprising code executable by the at least one processor to cause the apparatus to:
transmit a system information block (SIB), to a user equipment (UE), containing system information, wherein values of bits of the system information indicate a resource set of sixteen configured resource sets, each resource set containing sixteen resources for physical uplink control channel (PUCCH) transmission, wherein the values of the bits of the system information map to a number of symbols, a first symbol, and a set of one or more initial cyclic shift (CS) indexes corresponding to the indicated resource set, and wherein the values of the bits of the system information further indicate a set of repetition factors for the PUCCH transmission, a set of RB indexes and a set of one or more orthogonal cover code (OCC) indexes for the PUCCH transmission;
transmit downlink control information (DCI) on physical downlink control channel (PDCCH) associated with a control channel element (CCE) index, to the UE, containing resource indicator (RI) bits, wherein the CCE index and an explicit value of the RI bits together indicate a resource index, r, corresponding to one of the sixteen resources of the indicated resource set available for the UE to use for transmitting uplink control information (UCI) in the PUCCH transmission; and monitor the one of the sixteen resources for the PUCCH transmission.

26. The apparatus of claim 25, wherein the system information is provided via remaining system information (RMSI) bits.

27. The apparatus of claim 26, wherein:
the RMSI bits comprise 4 bits, and
the RI bits comprise 3 bits.

28. The apparatus of claim 25, wherein at least one of:
the set of RB indexes for the sixteen resource sets comprises sets of 2 RBs, 4 RBs, and 8 RBs, or
the set of one or more OCC indexes indicates 1 or 2 OCCs.

29. The apparatus of claim 25, wherein:
a first RB index is for a first hop of a frequency hopping pattern, and
a second RB index is for a second hop of the frequency hopping pattern based on the frequency hopping pattern and the first RB index for the first hop.

30. The apparatus of claim 25, wherein:
the resource index is indicated via a function of the values of the RI bits and the CCE index.

31. The apparatus of claim 30, wherein:
the CS index is implicitly derived based on one or more relative resource indexes.

32. The apparatus of claim 25, wherein the one of the sixteen resources is at an edge of a system bandwidth.

33. A non-transitory computer readable medium storing computer executable code thereon for wireless communications, comprising:
code for receiving a system information block (SIB) containing system information, wherein values of bits of the system information indicate a resource set of sixteen configured resource sets, each resource set containing sixteen resources for physical uplink control channel (PUCCH) transmission, wherein the values of the bits of the system information map to a number of symbols, a first symbol, and a set of one or more initial cyclic shift (CS) indexes corresponding to the indicated resource set, and wherein the values of the bits of the system information further indicate a set of repetition factors for the PUCCH transmission, a set of RB indexes and a set of one or more orthogonal cover code (OCC) indexes for the PUCCH transmission;

code for receiving downlink control information (DCI) in a physical downlink control channel (PDCCH) containing resource indicator (RI) bits;

code for determining a resource index, r, corresponding to one of the sixteen resources of the indicated resource set based on an explicit value of the RI bits and on a control channel element (CCE) index of the PDCCH; and code for transmitting uplink control information (UCI) in the PUCCH using the one of the sixteen resources.

34. A non-transitory computer readable medium storing computer executable code thereon for wireless communications, comprising:
code for transmitting a system information block (SIB), to a user equipment (UE), containing system information, wherein values of bits of the system information indicate a resource set of sixteen configured resource sets, each resource set containing sixteen resources for physical uplink control channel (PUCCH) transmission, wherein the values of the bits of the system information map to a number of symbols, a first symbol, and a set of one or more initial cyclic shift (CS) indexes corresponding to the indicated resource set, and wherein the values of the bits of the system information further indicate a set of repetition factors for the PUCCH transmission, a set of RB indexes and a set of one or more orthogonal cover code (OCC) indexes for the PUCCH transmission;

code for transmitting downlink control information (DCI) on physical downlink control channel (PDCCH) associated with a control channel element (CCE) index, to the UE, containing resource indicator (RI) bits, wherein the CCE index and an explicit value of the RI bits together indicate a resource index, r, corresponding to one of the sixteen resources of the indicated resource set available for the UE to use for transmitting uplink control information (UCI) in the PUCCH transmission; and code for monitoring the one of the sixteen resources for the PUCCH transmission.

* * * * *